United States Patent [19]

Busch

[11] 4,031,996

[45] June 28, 1977

[54] TAB REPOSITIONING SYSTEM

[75] Inventor: Dennis Gene Busch, Austin, Tex.

[73] Assignee: International Business Machines Corporation, Armonk, N.Y.

[22] Filed: Dec. 31, 1975

[21] Appl. No.: 645,732

[52] U.S. Cl. .................................. 197/176; 197/19
[51] Int. Cl.$^2$ ......................................... B41J 25/18
[58] Field of Search ............. 197/19, 20, 176, 177, 197/178, 179

[56] References Cited

UNITED STATES PATENTS

| 3,625,335 | 12/1971 | Ricciardi et al. | 197/176 |
| 3,812,945 | 5/1974 | Koplow et al. | 197/178 X |
| 3,832,697 | 8/1974 | Kashio | 197/176 X |
| 3,885,663 | 5/1975 | Suzuki | 197/176 |

FOREIGN PATENTS OR APPLICATIONS 1,176,441  1/1970  United Kingdom ............... 197/176

Primary Examiner—Ernest T. Wright, Jr.
Attorney, Agent, or Firm—James H. Barksdale, Jr.

[57] ABSTRACT

A system for resetting or repositioning one set tab and causing following tabs to be repositioned. The apparatus is primarily made up of an electronic tab rack for storing the location of set tabs, input means for defining a new location for one of the set tabs, and logic means for repositioning the one tab to the new location in the tab rack and causing all following tabs to be repositioned in the tab rack. The system of this invention also has a memory for storing text and tab codes, an output device for displaying text, and control means for controlling the display of text relative to the repositioned tabs.

10 Claims, 10 Drawing Figures

TAB REPOSITIONING SYSTEM

BACKGROUND OF THE INVENTION

1. Field of the Invention

This invention relates generally to setting tabs. More specifically, this invention relates to changing the location of one set tab and causing a change in the location of following set tabs.

2. Description of the Prior Art

Heretofore, the setting and clearing of tabs, and the handling of text, including columns, relative to set tabs, have been accomplished in numerous ways. For example, on the IBM Mag Card II and the IBM Memory Typewriter, tabs are automatically set every five units upon power "on." The operator can then escape the carrier and clear the set tabs and set other tabs. The locations of the set tabs are stored in a random access memory. Text codes and tab codes are then keyed and stored in an included electronic dynamic shift register memory. Upon playout of the text from the stored text and tab codes in the shift register memory, the text is properly aligned relative to the set tabs.

Other known art includes U. S. Pat. Nos. 3,625,335; 3,812,945; 3,832,697; and 3,885,663. These patents were developed during a patentability search in the U.S. Pat. and Trademark Office. From a review of these patents, no disclosure appears which is particularly pertinent to this invention. That is, in U.S. Pat. No. 3,625,335 there is disclosed apparatus for inhibiting printing and causing backspacing for keyed characters from a tabulation position. The characters are stored during keying. Upon release, there is a justified printout of the stored characters against a tabulation position. U.S. Pat. No. 3,812,945, as far as tabulation is concerned, discloses a system for aligning a column of numbers with respect to decimal points. U.S. Pat. No. 3,832,697 deals with handling digits within a column. A tabulating system is disclosed in which the number of digits to be printed out in respective columns can be set in order that information stored in a register can be tabulated. U.S. Pat. No. 3,885,663 deals with vertically aligning columnar text relative to set tabs.

An important point to note with respect to the above is that the resetting or repositioning of one set tab will in no way affect any other set tab. With this invention, not only will the resetting of one tab affect other set tabs, the relative spacing of following set tabs will be maintained upon the resetting of a tab.

SUMMARY OF THE INVENTION

A system is provided for maintaining the relative spacing of following set tabs upon the resetting of a tab. By maintaining this relative spacing, text columns in particular can be adjusted relative to one another and to a page. The storage and repositioning of tabs can be such that the adjusting of text columns relative to one another and the page can result in the columns being shifted horizontally along the page, off of the page, and back onto the page. Therefore, as to text columns, the system is in essence a tab margin control system. The system utilizes an electronic tab rack and control logic for controlling the tab rack upon the resetting of a tab. During either input keying or upon power on, tabs are set in the tab rack. An one of these set tabs can be reset to a different location through tabbing and/or spacing. The resetting of one tab will cause all following tabs to be moved or migrated a corresponding extent. That is, upon the resetting of one tab, all following tabs will be moved such that the relative spacing therebetween will be maintained.

DESCRIPTION OF THE PREFERRED EMBODIMENT

Operations to be Performed

Figure 1:
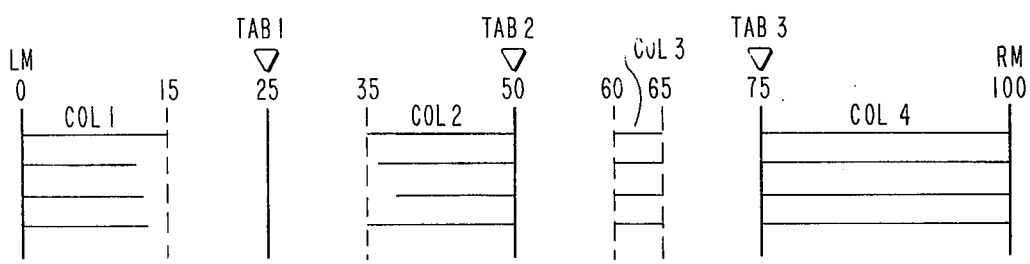
FIG. 1 is a pictorial representation of four columns of text printed in various formats between left and right margins relative to three set tabs.

For a more detailed description of the invention, reference will first be made to those figures of the drawing which illustrate the operations to be performed in terms of resetting set tabs.

Referring first to FIG. 1, there is shown a starting format for purposes of explanation. This starting format, in terms of the locations of the tabs and the left and right margins, can be derived according to the techniques described hereinafter. Shown are four columns of text printed between a left margin and a right margin relative to tab 1, tab 2 and tab 3. Here, the measure defined by the left margin and the right margin is 100 units in length. Tab 1 is set 25 units from the left margin, tab 2 is set 50 units from the left margin, and tab 3 is set 75 units from the left margin. The text represented by the horizontal lines is printed in a flush left format in column 1, a flush right format in column 2, a centered format in column 3, and a justified format in column 4.

The resetting of a tab is herein meant to include the repositioning of a defined tab rather than the normal clearing of one tab and/or the setting of another tab at another location. The techniques and structure for accomplishing the resetting of a tab, as well as the normal setting and clearing of tabs, will be described hereinafter.

Figure 2:
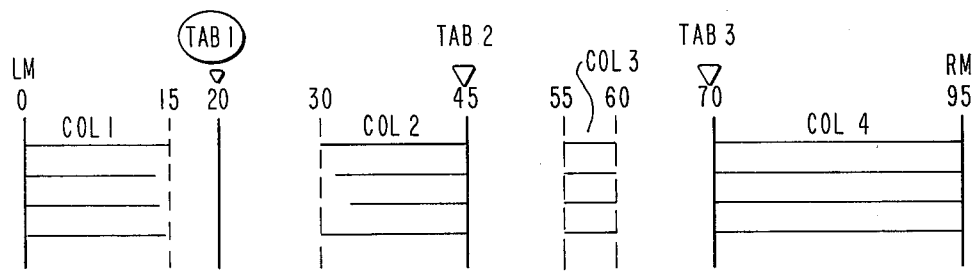
FIG. 2 is a pictorial representation similar to FIG. 1 with the first and following tabs reset to the left.

It is to now be assumed that, due to measure restraints caused by the size of the paper being printed on, the left and right margins must be spaced 95 units apart. In order to be able to place the four columns shown in FIG. 1 within a 95 unit measure, there must be a repositioning of at least one of the set tabs 1–3 to the left. It is also to be assumed that the left margin is set at the zero position on the writing line, and that the first column cannot be repositioned to the left. The first step an operator can take is to reset tab 1 to the left. Resetting tab 1 5 units to the left will reduce the measure to 95 units. This is so according to this invention, since tabs 2 and 3 will be repositioned a corresponding extent to the left. With tab 1 reset 5 units to the left and 20 units from the left margin, the relative spacing of following tabs 2 and 3 will be maintained at 25 units. As shown in FIG. 2, tab 2 will now be located 45 units from the left margin and tab 3 will be located 70 units from the left margin.

Figure 3:
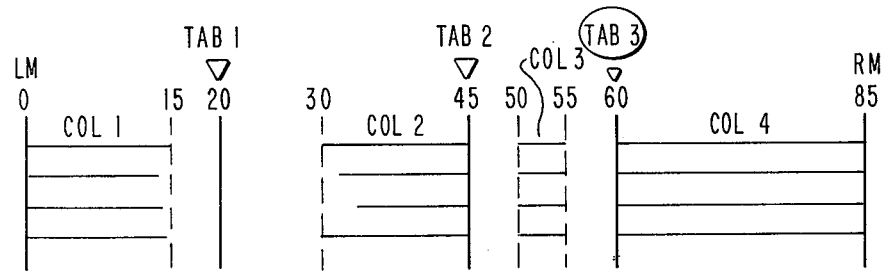
FIG. 3 is a pictorial representation similar to FIG. 2 with the third tab reset to the left.

If the ultimate goal were to operate within an 85 unit measure, then the next step could be to reset tab 3 10 units to the left of the position shown in FIG. 2. The printed or displayed page would then be as shown in FIG. 3. The tabs circumscribed (tab 1 in FIG. 2 and tab 3 in FIG. 3) are those which have been reset to a different location.

Figure 4:
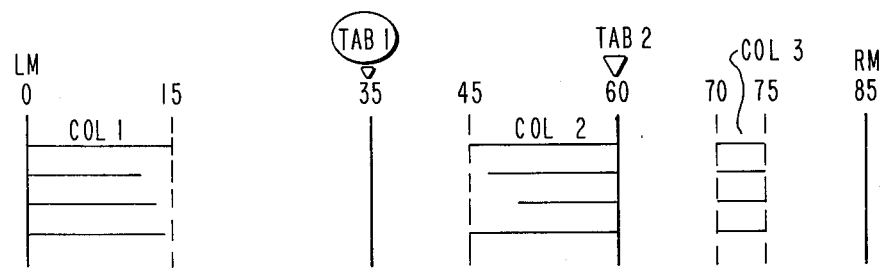
FIG. 4 is a pictorial representation similar to FIG. 1 with the first and following tabs reset to the right and the fourth column shifted off of the page.

Referring next to FIG. 4, it is to be assumed that operation is to be within an 85 unit measure and only the first three columns are to be displayed. Display herein is meant to include either the printing of text with a printer or the display of text with a CRT. It is to also be assumed that the starting format is as shown in FIG. 1. For displaying only three columns within an 85 unit measure, tab 1 can be reset from the 25 unit position shown in FIG. 1 to the 35 unit position shown in FIG. 4. This will cause tab 2 to be displaced 10 units to the right and located 60 units from the left margin. The ten unit displacement of tab 1 and tab 2 will in effect result in column 4 being shifted off of the page. This is so from the above, since the right margin is set 85 units from the left margin.

Figure 5:
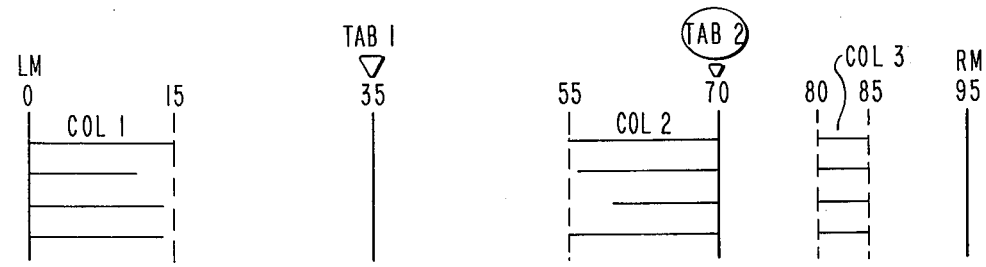
FIG. 5 is similar to FIG. 4 with the second tab reset to the right.

If the ultimate goal were to display the three columns within a 95 unit measure, then, as shown in FIG. 5, tab 2 could be reset to the right 10 units from the position shown in FIG. 4. As shown in FIG. 5, three columns have been adjusted across a page and within a 95 unit measure.

GENERALIZED DESCRIPTION

Figure 6:
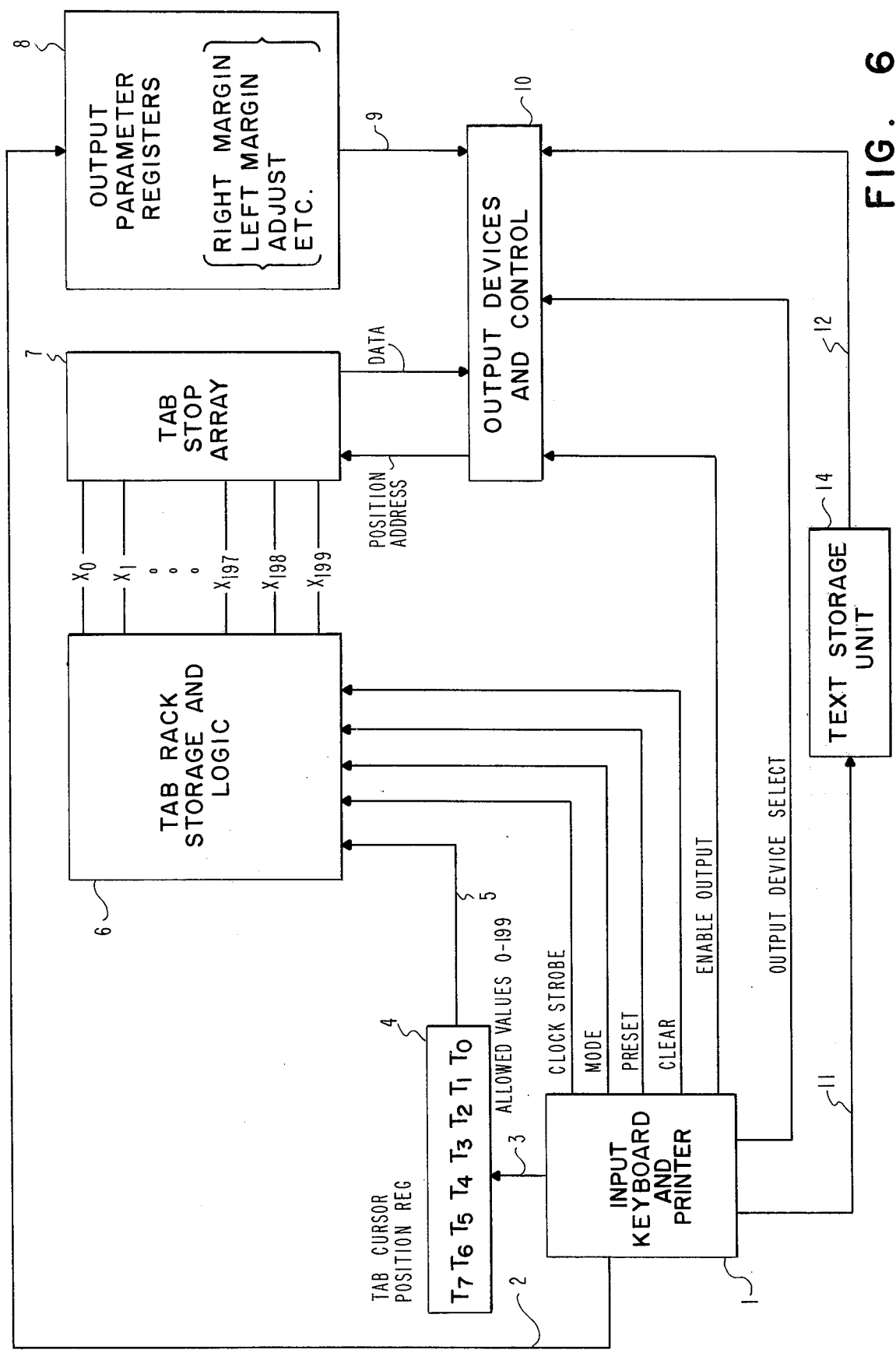
FIG. 6 is a block diagram illustrating the various components making up an overall system according to this invention.

Referring next to FIG. 6, there is shown a block diagram of the overall system according to this invention. An input keyboard and printer 1 is utilized for outputting signals along line 2 to output parameter registers 8. These signals will result in the setting of the left and right margins, and the determining of the format mode in terms of flush right, flush left, center, justify and adjust.

Keyboard and printer 1 is connected along line 3 to tab cursor position register 4. Register 4 is a resettable up/down counter for counting the units of escapement of a carrier included in keyboard and printer 1 from the left margin. This counter is structured to count from 0 to 199. Tab position register 4 has eight outputs T0–T7 which are hardwired to tab rack storage and logic 6. This is represented by line 5. Other outputs from keyboard and printer 1 include the clock strobe, mode, preset, and clear lines connected to tab rack storage and logic 6. Coded spaces and backspaces are applied along the mode line for the resetting of the tabs stored in tab rack storage and logic 6 according to this invention. Signals are applied along the preset and clear lines for setting and clearing tabs in a normal or conventional manner. Yet other outputs from keyboard and printer 1 include "enable output" and "output device select" applied to output devices and control 10. The signals applied along the enable output line make up an operation command. The signals applied along the output device select line cause an available one of output devices and control 10, such as a printer, CRT, etc., to be selected. The remaining output from keyboard and printer 1 is along line 11 to text storage unit 14 wherein text and tab codes keyed on keyboard and printer 1 are stored. The text and tab codes stored in text storage unit 14 are applied along line 12 to output devices and control 10 for output purposes.

Reference to signals herein is generally meant to include either a one (up) or a zero (down) applied along the various lines.

Tab rack storage and logic 6 is connected along the X0 through X199 lines to tab stop array 7. Tab stop array 7 is a conventional address decode for lines X0–X199. Lines X0–X199 correspond to each escapement position of the carrier included in keyboard and printer 1. An "up" signal applied along one of these lines to array 7 will denote that a tab is set at a corresponding position along the platen of keyboard and printer 1. Output devices and control 10 addresses array 7 along the position address line to determine the location of set tabs. This information is then output along the data line to output devices and control 10. The information stored in output parameter registers 8 is available along line 9 to output devices and control 10.

With the above described arrangement, tabs can be set and cleared, and text and tab codes can be keyed and stored in a conventional manner with known apparatus to obtain the starting format shown in FIG. 1. For example, an operator will set the left margin on keyboard and printer 1 and the location thereof will be stored in output parameter registers 8. Then the carrier is caused to escape. When the carier is positioned at each desired tab stop, a tap will be set and a signal will be applied along the preset line to tab rack storage and logic 6. As escapement continues and the carrier is positioned at a location corresponding to the desired right margin, the right margin is set. The location thereof is then stored in output parameter registers 8. The carrier is then caused to return to the left margin. The text making up each of the columns is then keyed along with tab codes. The tab codes are ultimately utilized for proper positioning of the text relative to the set tabs. If, during the setting of tabs, one tab were set in the wrong place, it could be cleared by depressing a clear button on keyboard and printer 1. A signal would then be applied from keyboard and printer 1 to tab rack storage and logic 6 along the clear line. Thereafter, the carrier could be repositioned to the correct tab point and a tab could be set by depressing a preset button on keyboard and printer 1. A signal would be applied from keyboard and printer 1 to the tab rack storage and logic 6 along the preset line.

Referring again to FIG. 1, the tab migrate or repositioning mode of operation of this invention can be utilized to change the starting format to a format shown in one of FIGS. 2–5. To derive the tab format shown in FIG. 2, the carrier is tabbed, spaced, or otherwise caused to escape to the tab 1 position shown in FIG. 1. Thereafter, the carrier is caused to escape in the reverse direction by the operator keying coded backspaces. Following the keying of five coded backspaces, the carrier will be positioned 20 units from the left margin. This will effect the resetting of tab 1 from 25 units from the left margin to 20 units from the left margin. As mentioned earlier, the coded backspaces (zeros) are applied along the mode line from keyboard 1 to tab rack storage and logic 6. During initial carrier escapement for positioning the carrier at tab 1 in FIG. 1, register 4 will have been incremented to 25. Following reverse escapement of the carrier to the position of tab 1 in FIG. 2, register 4 will have been decremented to 20. The resetting of tab 1 from the 25 unit position in FIG. 1 to the 20 unit position in FIG. 2 will result in the migration or repositioning of following tabs a corresponding extent. This will be accomplished by tab rack storage and logic 6. The resetting of tab 1 from the 25 unit position to the 20 unit position will result in line X25 being driven down and line X20 being driven up for loading tab stop array 7. Correspondingly, line X50 will be driven down and line X45 will be driven up, and line X75 will be driven down and line X70 will be driven up. The location of the tab stops in tab stop array 7 can then be used for controlling the positioning of text by output devices and control 10.

TAB RACK STORAGE AND LOGIC

Figure 7:
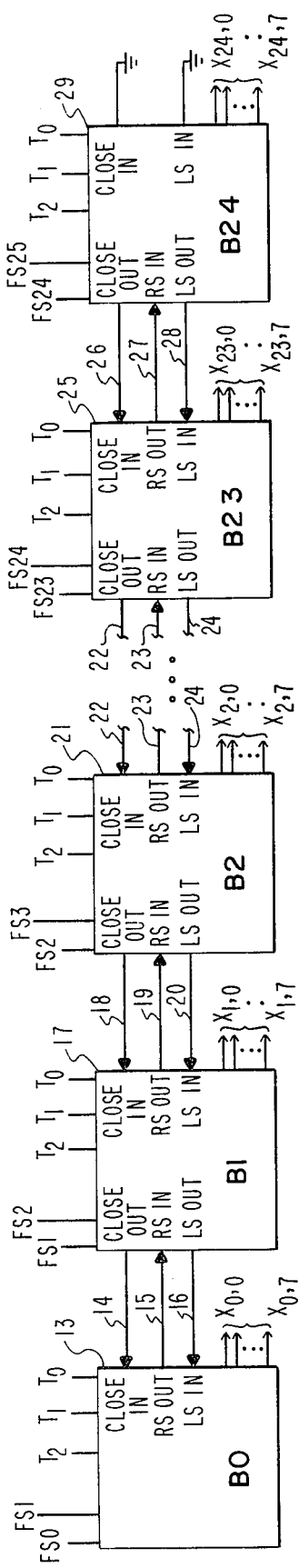
FIG. 7 illustrates the tab rack portion of the tab rack storage and logic of FIG. 6 broken down into bytes.
Figure 8:
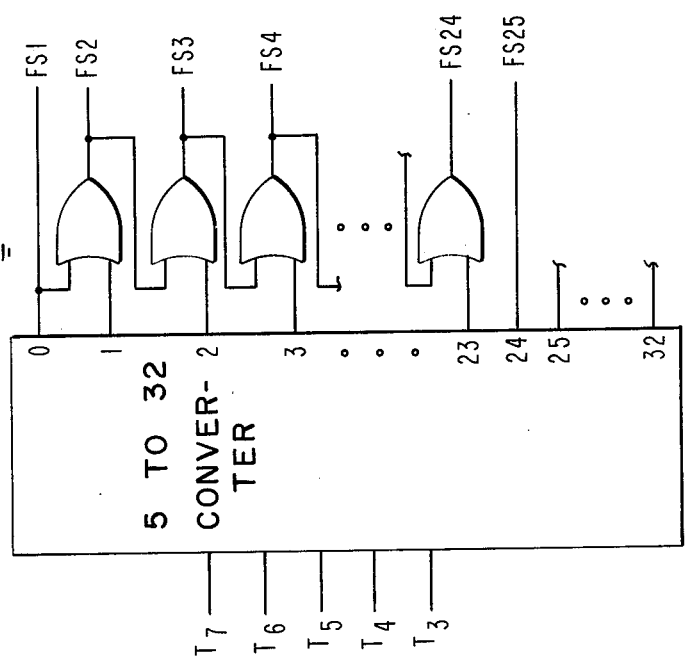
FIG. 8 illustrates a converter included in the tab rack storage and logic of FIG. 6.

The tab rack storage and logic 6 shown in FIG. 6 is broken down into greater detail in FIG. 7. Referring specifically to FIG. 7, there are represented 25 eight bit bytes B0–B24. Each bit corresponds to an escapement unit position of the carrier of keyboard and printer 1 along a platen where a tab can be set. For purposes of clarity, it is to be assumed herein that keyboard and printer 1 is a standard spacing machine rather than a proportional spacing machine. The structure included in each of the byte blocks B0–B24 in terms of combinational logic and storage will be described later herein when reference is made to subsequent figures. The first byte B0, designated by reference numeral 13, has inputs FS0, FS1, T0–T2, "close in" along line 14, and "left shift in"("LSIN") along line 16. The outputs from B0 are "right shift out" ("RSOUT") along line 15, and X0,0–X0,7. The FS0 and FS1 inputs are derived from the T3–T7 outputs from register 4 in FIG. 6. The FS(J) and FS(J+1) inputs (FIG. 9) define the particular byte addressed. J equals 0 for byte B0. Referring next to FIG. 8, there is shown a 5 to 32 converter. This converter decodes the T3–T7 outputs from register 4 and provides outputs FS1–FS25 which are applied to bytes B0–B24 in FIG. 7. FS26–FS33 are not used. FS0 is connected to ground and is always zero.

Reference to "inputs" and "outputs" is generally meant to include ones (up signals) and zeros (down signals) applied along the various lines.

Referring again to FIG. 7, the T0–T2 inputs are obtained directly from register 4 in FIG. 6. The "close in" input to byte B0 is the "close-out" output from byte B1 designated by reference numeral 17. When a shift left signal is applied along line 14, the first bit in byte B1 is caused to be shifted along the bit line 16 into byte B0. The LSIN input to byte B0 is the "left shift out" (LSOUT) output from byte B1.

The RSOUT output from byte B0 is the right shift in (RSIN) input to byte B1. Line 15 is the bit line along which the last bit in byte B0 is shifted into the first bit position or cell of byte B1. The FS0 and FS1 inputs to byte B0 when 0 to 1, respectively, for a right shift, control the shifting of the last bit out of byte B0 into the first bit position in byte B1. This will be described in greater detail later in the specification.

The X0,0 through X0,7 outputs from byte B0 correspond to the X0 through X7 outputs from tab rack storage and logic 6 applied to array 7 in FIG. 6.

Referring next specifically to byte B1 in FIG. 7, the FS1 and FS2 inputs are derived from the T3–T7 outputs from register 4 in FIG. 6. From FIG. 8, the 5 to 32 converter decodes the T3–T7 outputs from register 4 and provides outputs FS1 and FS2.

The T0–T2 inputs are obtained directly from register 4 in FIG. 6. The close in input to byte B1 in the close out output from byte B2 designated by reference numeral 21. When a shift left signal is applied along line 18, the first bit in byte B2 is caused to be shifted along the bit line 20 into byte B1. The LSIN input to byte B1 is LSOUT output from byte B2.

The RSOUT output from byte B1 is the RSIN input to byte B2. Line 19 is the bit line along which the last bit in byte B1 is shifted into the first bit position or cell of byte B2. The FS2 and FS3 inputs to byte B2 control the shifting of the last bit out of byte B1 into the first bit position of byte B2.

The X1,0–X1,7 outputs from byte B1 correspond to the X8–X15 outputs from tab rack storage and logic 6 applied to array 7 in FIG. 6.

The succeeding bytes B3–B22 have inputs and outputs similar to bytes B1 and B2 and the interconnections between bytes B2 and B23 are represented by lines 22–24.

The FS23 and FS24 inputs to byte 23 are derived from the T3–T7 outputs from register 4 in FIG. 6. From FIG. 8, the 5 to 32 convertor decodes the T3–T7 outputs from register 4 and provides outputs FS23 and FS24.

The T0–T2 inputs the byte B23 are obtained directly from register 4 in FIG. 6. The close in input to byte B22 (not shown) is the close out output from byte B23 designated by reference numeral 25. When a shift left signal is applied along line 22, the first bit in byte B23 is caused to be shifted along the bit line 24 into byte B22. The LSIN input to byte B22 is the LSOUT output from byte B23.

The RSOUT output from byte B22 is the RSIN input to byte B23. Line 23 is the bit line along which the last bit in byte B22 is shifted into the first bit position or cell of byte B23. The FS23 and FS24 inputs to byte B23 control the shifting of the last bit out ot byte B22 into the first bit position in byte B23.

The X23,0–X23,7 outputs from byte B23 correspond to the X184–X191 outputs from tab rack storage and logic 6 applied to array 7 in FIG. 6.

The FS24 and FS25 inputs to byte B24 are derived from the T3–T7 outputs from register 4 in FIG. 6. The 5 to 32 converter shown in FIG. 8 decodes the T3–T7 outputs from register 4 and provides the outputs FS24 and FS25.

The T0–T2 inputs to byte B24 are obtained directly from register 4 in FIG. 6. The close in input to byte B23 is the close out output from byte B24 designated by reference numeral 29. When a shift left signal is applied along line 26, the first bit in byte B24 is caused to be shifted along the bit line 28 into byte B23. The LSIN input to byte B23 is the LSOUT output from byte B24.

The RSOUT output from byte B23 is the RSIN input to byte B24. Line 27 is the bit line along which the last bit in byte B23 is shifted into the first bit position or cell of byte B24. The FS24 and FS25 inputs to byte 24 control the shifting of the last bit out ot byte B23 into the first bit position in byte B24.

The X24,0–X24,7 outputs from byte B24 correspond to the X192–X199 outputs from tab rack storage and logic 6 applied to array 7 in FIG. 6. The close in and LSIN inputs to byte B24 are obtained from ground and are thus 0.

Each of the bytes B0–B24 have inputs clock strobe, mode, preset, and clear which have not been shown for purposes of clarity. These inputs will be described below when reference is made to subsequent figures.

Figure 9:
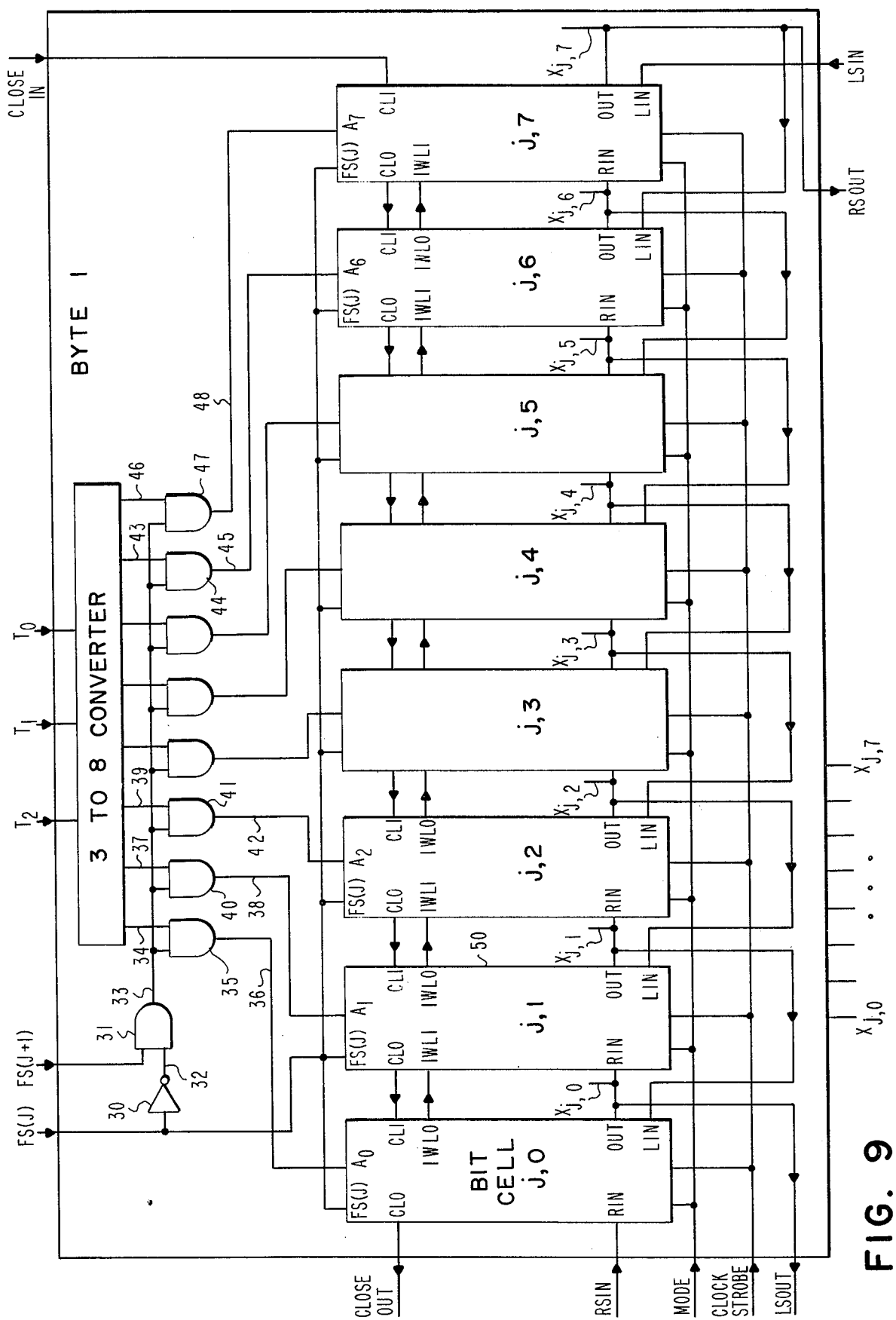
FIG. 9 illustrates the bit cells and logic included in a byte of FIG. 7.

Referring next to FIG. 9, there is shown combinational logic, storage, and a decode broken down as far as bit cells j,0–j,7. It is to be assumed that what is shown is included in byte B1 of FIG. 7. In this case, FS(J) and FS(J+1) are equal to FS1 and FS2, respectively. The T0–T2 input lines to byte B1 are applied to a 3 to 8 convertor which decodes the combination of signals applied along these lines. The outputs from the 3 to 8 converter are applied to the AND gate tier extending from 35 to 47. The other inputs to this AND gate teir 35–47 are derived from the FS1 and FS2 inputs to byte B1. the FS1 input is applied to inverter 30 and then along line 32 to AND gate 31. The FS2 input is the other input to AND gate 31. The output of AND gate 31 is applied along line 33 to the AND gate tier 35–47.

If both FS1 and FS2 are up or one, then there is to be a shift of all bits either to the right or to the left. The input along the mode line will determine the direction of shift. If FS1 is 0 and FS2 is 1, then the carrier is located at a position corresponding to a bit within byte B1 addressed by T0–T2. In this case, there will be a partial shift within the byte B1. That is, not all bits within the byte B1 will be shifted. Again, the T0–T2 inputs to byte B1 determine the bit within the byte B1 which is being addressed. This will be described in further detail when reference is made to FIG. 10.

As has been pointed out, the output of AND gate 31 is along line 33. The first AND gate in the tier 35–47 is AND gate 35. The other input to AND gate 35 is from the 3 to 8 convertor along line 34. The output of AND gate 35 is along the A0 line 36. The output from AND gate 31 along line 33 is also applied to AND gate 40. The other input to AND gate 40 is along line 37. The output of AND gate 40 is along the A1 line 38. The output of AND gate 31 is also applied along line 33 to AND gate 41. The other input (one or zero) to AND gate 41 is determined by the combination of signals T0–T2 applied to the 3 to 8 convertor and output along line 39. The output of AND gate 41 is applied along the A2 line 42 to bit cell $j,2$. Each succeeding bit cell $j,3$ through $j,7$ is similarly connected. For example, the output of AND gate 31 along line 33 is applied to AND gate 44. The other input to AND gate 44 is along line 43 from the 3 to 8 converter. The output of AND gate 44 is along the A6 line 45 to bit cell $j,6$. The output of AND gate 31 along line 33 is also applied to AND gate 47. The other input to AND gate 47 is along line 46 from the 3 to 8 convertor. The output of AND gate 47 is along the A7 line 48.

The close out line to the left off bit cell $j,0$ in FIG. 9 is equivalent to line 14 in FIG. 7. The "right shift in" (RSIN) line is equivalent to line 15 in FIG. 7. The close in line in the upper right-hand corner is equivalent to line 18 in FIG. 7. The left shift out (LSOUT) line in the bottom left hand corner is equivalent to line 16 in FIG. 7. The $Xj,0$ through $Xj,7$ outputs to the right of each of the bit cells in FIG. 9 are also illustrated at the bottom of byte 1. These outputs are equivalent to the X1,0 through X1,7 outputs from byte B1 in FIG. 7. The mode and clock strobe inputs to byte 1 in FIG. 9 are equivalent to the mode and clock strobe outputs from input keyboard and printer 1 applied to tab rack storage and logic 6 in FIG. 6. The right shift out (RSOUT) output in the bottom right-hand corner of FIG. 9 is equivalent to line 19 in FIG. 7. The left shift in (LSIN) input to byte 1 in FIG. 9 is equivalent to line 20 in FIG. 7.

As pointed out above, if both FS1 and FS2 are up or one, then the contents, or bits, in each of the bit cells $j,0$–$j,7$ are to be shifted either to the right or the left. In this case, no bit within byte 1 has been addressed. The ultimate shifting of either a 0 or 1 included in bit cell $j,0$ will be along the out line for bit cell $j,0$ and into bit cell $j,1$ along the right in (RIN) line for a right shift. Here, the right shift will have begun in a previous byte. This is due to FS1 and FS2 being up. Each succeeding cell is similarly affected. Whether a tab is set or not, depending upon the 0 or 1 applied along this line, a 0 or 1 will be applied along the $Xj,0$ line and a corresponding one of lines X0–X199 from tab rack storage and logic 6 to tab stop array 7 in FIG. 6. If before the right shift a one were in bit cell $j,0$, this would denote a set tab. Following one shift, this one would be in bit cell $j.1$. Thus, the tab will have been reset one unit to the right.

In a similar manner, the shifting of either a 0 or 1 included in bit cell $j,1$ will be along the out line for bit cell $j,1$ and into bit cell $j,0$ along the left in (LIN) line for a left shift. Here, the left shift will have begun in a previous byte due to FS1 and FS2 being up.

If FS1 is 0 and FS2 is 1, then a particular cell in byte 1 is addressed depending upon the combination of 0 and 1 inputs along lines T0–T2. It is to be recalled that FS1 and FS2 address byte 1. The number of shifts either to the right or the left will be determined by the number of signals applied along the mode line. These signals are coded spaces (ones) and coded backspaces (zeros). Each shift will occur upon the clock strobe. If the cell addressed contains a one, a tab is being addressed. For a right shift, the tab is to be repositioned to the succeeding cell. For a left shift, the tab is to be repositioned to a preceding cell. For the left shift, there is simply a shift to the preceding cell. The cell preceding the addressed cell is clocked only one left shift. For a right shift, a zero is written into the addressed cell, but preceding cells are not affected. Only following tabs are affected. If there is to be a left ripple, or shift to the left, then a signal is applied along the "close look ahead output" (CLO) line. The bit, 1 or 0, will then be output along the "out" line and from the left in (LIN) input to the preceding cell. CLO causes the preceding cell to clock on the clock strobe.

For a shift to the left of the contents of the first cell of one byte, when addressed, to the last cell of preceding byte, a signal is applied along the close in and close out lines. A bit is then applied along the LSIN line to the preceding byte. The left shift out (LSOUT) and the left shift in (LSIN) lines are for shifting bits to the left between bytes. The right shift in (RSIN) and right shift out (RSOUT lines are for shifting bits to the right between bytes.

Figure 10:
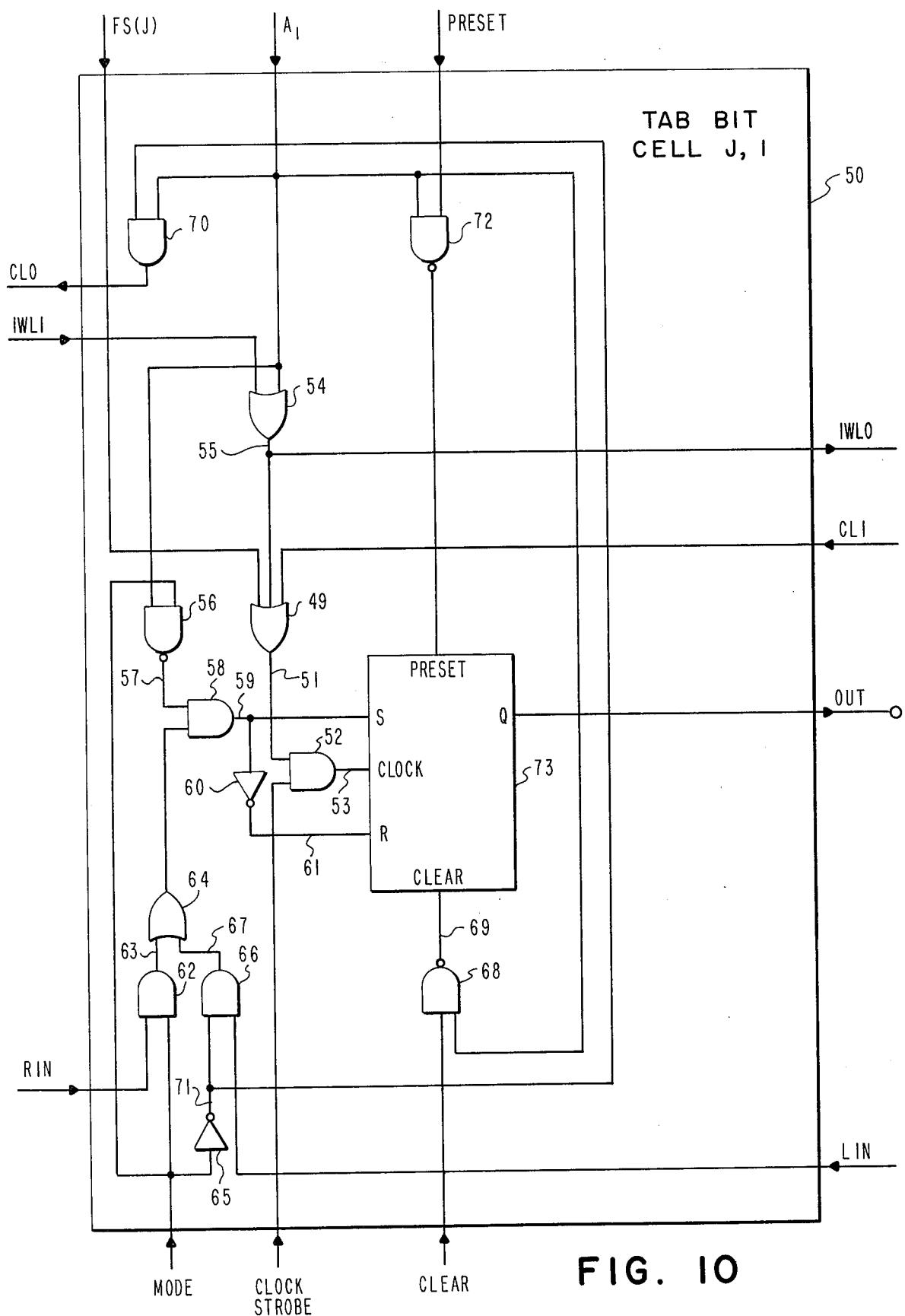
FIG. 10 illustrates the logic and storage included in a bit cell of FIG. 9.

As to further details concerning close look ahead output (CLO), close look ahead input (CLI), interbyte or "interword look ahead output" (IWLO) and interbyte or "interword look ahead input" (IWLI) reference is made to FIG. 10. In FIG. 10 there is shown the combinational logic and storage making up each bit cell. It is to be assumed that the structure shown in FIG. 10 is for bit cell $j,1$ in FIG. 9.

ADDRESSED SET TAB RESET TO LEFT

First, it is to be assumed that bit cell $j,1$ is being addressed along the A1 line 38 in FIG. 9, contains a one, and there is to be a shift to the left. In this case, a 1 or up signal is applied along the A1 line to OR gate 54 in FIG. 10. The output of OR gate 54 is applied along line 55 to OR gate 49. The output of OR gate 49 is applied along line 51 to AND gate 52. The other input to AND gate 52 is the clock strobe. With both signals being up, an output from AND gate 52 is applied along the clock 53 to clock latch register 73. This will result in an up Q output being applied along the "out" line for resetting the tab to the preceding cell.

The up signal applied along the A1 line is also applied to NAND gate 56. The other input to NAND gate 56 is a down signal due to a coded backspace being applied along the mode line. The subsequent one output from NAND gate 56 is applied along line 57 to AND gate 58. The other input to AND gate 58 is derived from the coded backspace down output applied along the mode line. The shifting of a bit from the preceding cell along the RIN line is inhibited by AND gate 62. The down input along the mode line is applied to invertor 65. The subsequent up output from invertor 65 is applied to both AND gate 66 and AND gate 70. The output of AND gate 70 along the CLO line is for clocking the preceding cell when an up output is applied along the CLO line. Clocking of the preceding cell will be necessary in this instance, since the tab is to be reset to the left. That is, the bit in cell $j,1$ is to be shifted to cell $j,0$. The other input to AND gate 70 is up along the A1 line as described earlier.

The other input to AND gate 66 is along the LIN line from the succeeding cell. Since the bits (either zero's or one's) in all following cells are to be shifted to the left, the input along the LIN line will be either up or down. This will depend on whether a tab is set in the succeeding cell.

If a tab were set in the succeeding cell, a one input would be applied along the LIN line and gated through AND gate 66. This one would then be applied along line 67, through OR gate 64, and to AND gate 58. The one output from AND gate 58 would then be applied along line 59 and the set line to latch register 73 for storage.

If a tab were not set in the succeeding cell, a zero input would be applied along the LIN line and in essence gated through AND gate 66. This zero would then be applied along line 67, through OR gate 64, and gated through AND gate 58. The zero output from ANd gate 58 would be applied along line 59 to invertor 60. The one output from invertor 60 is applied along line 61 and the reset line to latch register 73 for resetting it to zero.

The preceding bit in latch register 73 was shifted out along the out line during the same clock time that the succeeding bit was shifted in along the LIN line. This occurred due to a signal being applied along the CLO line. It is to be recalled that the CLO output from one cell is the CL1 input to a preceeding cell. Assume for a moment that the cell shown in FIG. 10 is cell $j,0$. In this case, the CLO output from cell $j,1$ is applied along the CL1 line to OR gate 49. The output of OR gate 49 is along line 51 to AND gate 52. An up output along line 53 will cause latch register 73 to clock upon the clock strobe. Then the one in cell $j,1$ is gated out along the out line and along the LIN into latch register 73 of cell $j,0$.

It is to be noted that each addressing and shifting of a tab or one bit to the left requires a separate operation as described above.

SET TAB NOT ADDRESSED-LEFT SHIFT

The shifting of following tabs when a tab is not addressed will now be described. It is to be assumed that bit cell $j,1$ is being addressed along the A1 line, contains a zero, and there is to be a shift to the left. A signal along the CLO line and along the CL1 line into the preceding cell will cause clocking of the preceding cell. The zero output from cell $j,1$ along the out line and along the LIN line to cell $j,0$ will in essence cause a write over of the contents (0 or 1) of cell $j,0$ with a zero. Any cell previous to cell $j,0$ will not be affected since A0 will be down until the carrier has been backspaced and a previous cell is addressed.

From the above, even though a tab is not addressed, all tabs following an addressed cell are shifted to the left with the coded backspacing of the carrier.

ADDRESSED SET TAB RESET TO RIGHT

For this example, it is to be assumed that bit cell $j,1$ is being addressed along the A1 line, contains a one, and there is to be a shift to the right. When a right shift is to occur, there will always be a zero fill or input into the cell addressed upon escapement of the carrier for each coded space. The clocking of all cells following an addressed cell is caused by a signal applied along the IWL1 input line to the cells. This IWL1 input is derived from the IWLO output from the preceding cell. These inputs and outputs only occur within a byte and cause rippling for either a right or left shift.

A coded space or one applied along the mode line is inverted by invertor 65 to a zero which is applied along line 71. This will inhibit the clocking of the preceding cell along the CLO line. Since there is to be a shift to the right, the input along the LIN line must be inhibited. Since line 71 is down, there will be a down output from AND gate 66 along line 67. The output of NAND gate 56 will be down, and a zero will be output from AND gate 58. This will cause the resetting of latch register 73, and in essence a filling with a zero. The one previously in latch register 73 will have been output to the succeeding cell $j,2$.

SET TAB NOT ADDRESSED-RIGHT SHIFT

For this example it is to be assumed that bit cell $j,1$ is addressed along line A1, contains a zero, and there is to be a right shift. As with the previous example, there is simply a filling with zeros. This causes the distance between a previous tab and a succeeding tab to be increased.

CLEAR

Again, cell $j,1$ is being addressed and a set tab is to be cleared. To accomplish this, an up signal is applied along the clear line to NAND gate 68. The other input to NAND gate 68 is an up input along the A1 line. The output from NAND gate 68 will be down for clearing or setting latch register 73 to zero.

PRESET

With cell $j,1$ being addressed and containing a zero, a tab is set by applying an up signal along the preset line to NAND gate 72. The other input to NAND gate 72 is up along the A1 line. The down output from NAND gate 72 is used for setting a one into latch register 73.

In summary, a system is providing for maintaining the relative spacing of following set tabs upon the resetting of a tab. By maintaining this relative spacing, text columns, in particular, can be adjusted relative of one another and to a page. The storage and repositioning of tabs can be such that the adjusting of text columns relative to one another and the page can result in the columns being shifted horizontally along the page, off to the page, and back onto the page. Therefore, as to text columns, the system is in essence a tab margin control system. The system utilizes an electronic tab rack and control logic for controlling the tab rack upon the resetting of a tab. During either input keying or upon power on, tabs are set in the tab rack. Any one of these set tabs can be reset to a different location through tabbing an/or spacing. The resetting of one tab will cause all following tabs to be moved or migrated a corresponding extent. That is, upon the resetting of one tab, all following tabs will be moved such that the relative spacing therebetween will be maintained.

While the invention has been shown and described with reference to a particular embodiment, it will be understood by those skilled in the art that various changes in form and detail may be made without departing from the spirit of scope of the invention.

What is claimed is:

1. A tab repositioning system comprising:
   a. storage means having a number of storage locations for storing tabs set along a text line;
   b. means for addressing one of said storage locations in said storage means; and
   c. means upon addressing one of said storage locations for causing set tabs following said addressed location to be repositioned in said storage means.

2. A system according to claim 1 wherein said repositioning means includes means for causing said following set tabe to be repositioned such that the relative spacing between said following set tabs is maintained.

3. A system according to claim 2 wherein said addressing means includes means for addressing one of said set tabs.

4. A system according to claim 3 wherein said repositioning means includes means for repositioning said addressed set tab and following set tabs.

5. A system according to claim 4 including means for setting a tab in one of said storage locations without affecting any other set tab.

6. A system according to claim 5 including means for clearing a tab set in one of said storage locations without affecting any other set tab.

7. A system according to claim 1 wherein said storage means is made up of a number of interconnected byte blocks having a number of interconnected bit cells comprising said storage locations.

8. A system according to claim 7 wherein said bit cells include bit storage means for storing bits, and logic means for shifting said bits in and out of said bit cells.

9. A method of repositioning a set tab and effecting migration of following set tabs, said method comprising:
   a. resetting a set tab along a text line; and
   b. causing, upon resetting a set tab, set tabs following said reset tab to be reset along said text line.

10. A method according to claim 9 including causing the relative spacing between said following set tabs and said reset tab to be maintained upon resetting said following set tabs.

* * * * *